May 3, 1927.
W. S. LEWIS
TAKE-UP DEVICE
Filed Sept. 2, 1925
1,627,244
Fig. 1
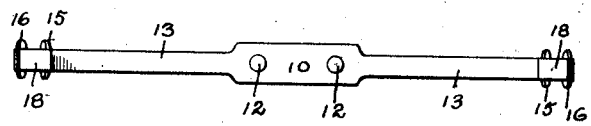
Fig. 2
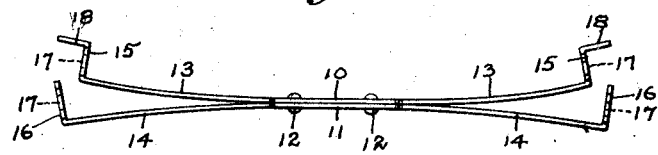
Fig. 3
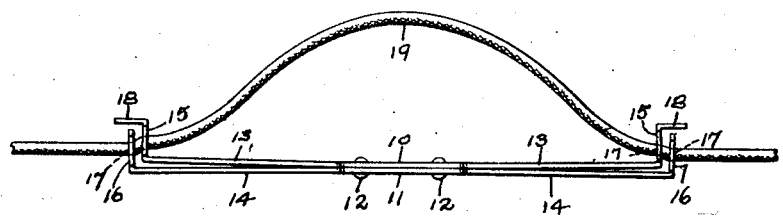
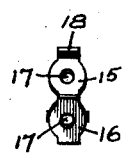
Fig. 4
INVENTOR
Wilbur S. Lewis
BY W. M. Hart.
ATTORNEY Patented May 3, 1927.

1,627,244

UNITED STATES PATENT OFFICE.

WILBUR S. LEWIS, OF CLEVELAND, OHIO.

TAKE-UP DEVICE.

Application filed September 2, 1925. Serial No. 53,973.

This invention relates to devices for securing slack taken in a length of insulated wiring, rope, or the like.

One of the objects of my invention is to provide a device of the above character which will normally engage the rope to secure the ends of the slack portion and which can be readily manipulated so that the rope can be moved freely relative thereto.

A further object of my invention is to provide a device for securing slack in a length of wiring which is simple in construction and can be readily operated and applied.

Another object of the invention is to provide a take up device which consists of a pair of elements which are related to automatically engage a length of wiring so as to secure slack therebetween, and which can be readily moved relatively to become disengaged from the wiring.

These and other objects, and the invention in detail will be described hereinafter.

In the accompanying drawings, Figure 1 is a plan view of a device embodying my invention; Fig. 2 is a side elevation of the device; Fig. 3 is a similar view of the device applied to a length of cord; and Fig. 4 is an end elevation of the device.

Referring now to the drawings by characters of reference, 10 and 11 represent a pair of members which are superimposed and secured integrally together at their central portions by rivets 12. The members 10 and 11 are formed of sheet metal of a stiff flexible nature, and the free portions 13 of the upper member 10 are bent adjacent the central portion and extend at an angle therefrom. The free portions 14 of the lower member 11 are bent adjacent the central portion and extend at an angle therefrom which diverges from angle at which adjacent portions 13 of the end portions of the member 10 are bent.

The free end portions 15 and 16 of the members 10 and 11, respectively, are bent in the same direction, substantially at right angles to the central body portions, and are provided with apertures 17 through which rope, wiring or the like can be positioned. The end portions 16 of the members 11 extend slightly beyond the end portions 15 of the members 10 and are formed so that they are substantially parallel when pressed adjacent each other. The extreme ends of the cord receiving portions 15 are bent outwardly to provide finger grips 18.

The rope, or insulated wiring 19 extends through the apertures 17 in the pairs of spaced free end portions 15 and 16, parallel with the members 10 and 11, and when the adjacent ends of the members 10 and 11 are moved toward each other so that the apertures therein are aligned, the cord can be freely moved therethrough to adjust the slack. Thus either end of the wiring can be shortened or lengthened by moving it intermediate the adjacent end portions of the members. When the adjacent end portions of the members 10 and 11 are released they will attempt to return to their normal position, due to their resiliency, and will bite against the wiring creating tension in opposite directions transversely of the direction the wiring extends, as seen in Fig. 2. Such tensional engagement in opposite directions will bind and secure the wiring with the take up device at the points where it extends through the aperture, so that any amount of slack can be secured intermediate the ends of the members. The finger grips are provided to provide means for readily engaging the device to move the ends toward each other.

It will be seen that I have provided a simple, inexpensive take up device which can be readily operated to change the length of wiring, and which will operate automatically to secure the wiring when it is adjusted therewith at the desired length.

Various changes can be made in the construction of the embodiment of the invention herein described without departing from the spirit of the invention and the scope of the appended claims.

What I claim is:—

1. In a take up device of the character described, a pair of superimposed resilient metal members, and means for securing said members integrally together at their central portions, the end portions of said members being bent relatively at angles diverging from the central portions and each having a cord receiving aperture formed adjacent the free ends thereof, said apertures being capable of being brought into substantial alignment by compression of the free ends of the members.

2. In a take up device of the character described, a pair of superimposed elements having enlarged central portions secured to each other adjacent the enlarged portions, said elements being formed of spring metal and having the adjacent ends of each pair normally spaced apart, cooperating cord retaining means carried by each of the elements, said means on each element permitting the cord to be freely moved when pressed towards each other and securing the cord therewith when released through their effort to return to their normal relative positions.

In testimony whereof, I hereunto affix my signature.

WILBUR S. LEWIS.